Sept. 15, 1970   K. F. MERRICK   3,528,236
PAN COVER
Filed June 10, 1968
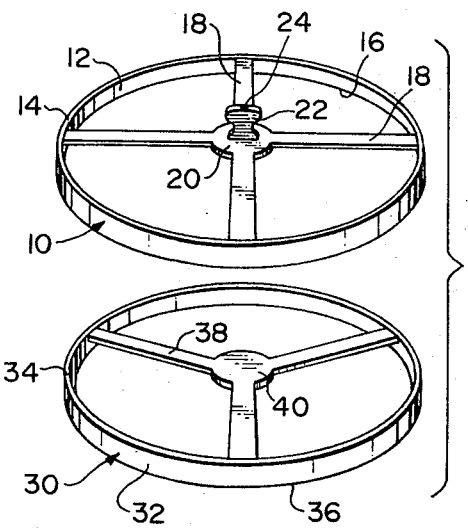
FIG. 1
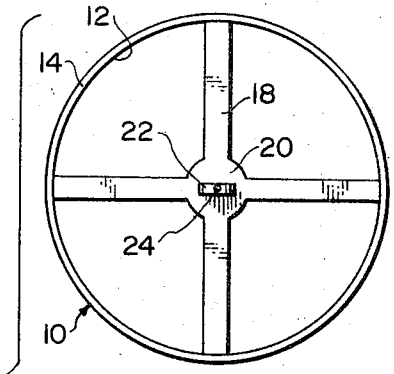
FIG. 1A
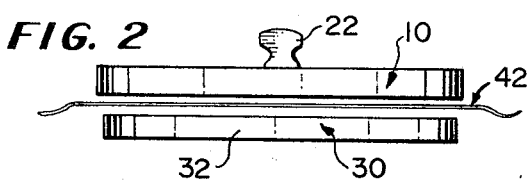
FIG. 2
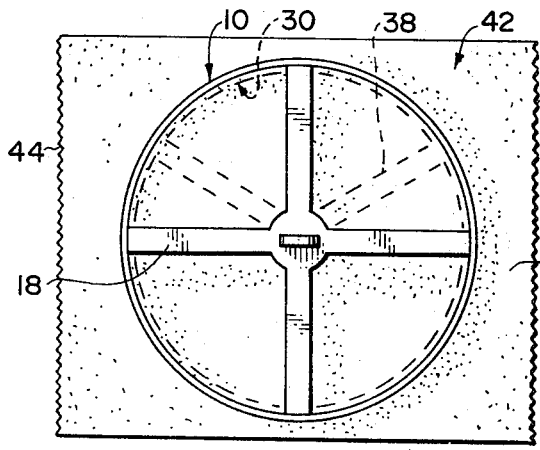
FIG. 2A
FIG. 3
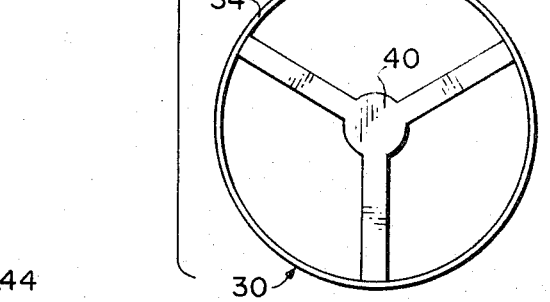
FIG. 4
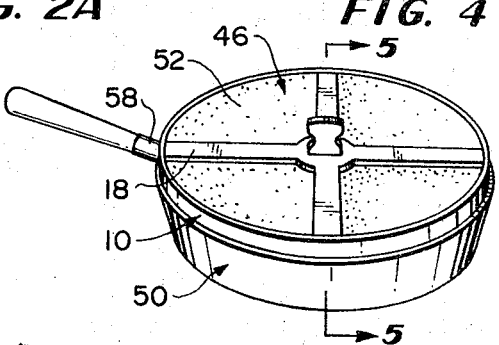
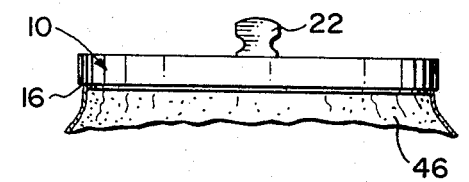
FIG. 6
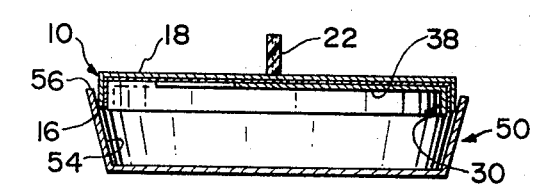
FIG. 5
INVENTOR
KEITH F. MERRICK
By Harbaugh & Thomas
Attorneys United States Patent Office 3,528,236
Patented Sept. 15, 1970

3,528,236
PAN COVER
Keith F. Merrick, 1418 Shermer Road,
Northbrook, Ill. 60062
Filed June 10, 1968, Ser. No. 735,817
Int. Cl. B01d 53/20; B65d 51/16
U.S. Cl. 55—384          5 Claims

ABSTRACT OF THE DISCLOSURE

The disclosure describes a pan lid or cover adapted to allow the escape of steam and retain grease particles whereby to eliminate or mitigate odor and smoke during frying processes, while attaining the proper browning and flavor-retention of fried foods. In one embodiment there is provided a pair of concentrically nesting tubular flanges or hoops adapted to retain the peripheral edge of a piece of absorbent paper, and hold same in distended, taut condition as the primary vapor and liquid barrier over the top of a pan. The inner flange has a thin, flat radial spoke member to support the absorbent paper in part and the outer or top flange has a knob to facilitate assembly of the piece of paper therein and handling the unit as a cover. The device is characterized by simple design, being adapted for use with paper towels and the ease with which it can be used and cleaned after use.

BACKGROUND OF THE INVENTION

The idea of providing a pan cover with a filter that will permit steam to escape and at the same filter the grease particles carried by the escaping steam is old in the art. Various forms of spatter lids are provided having retainers composed of perforated material, metal screen, fabric, cheese cloth and paper. Some of the filters are especially shaped to fit within the cover parts which are generally frusto-conical. The prior art devices are either quite cumbersome and awkward to use or include apertures, hinges or irregular-shaped parts which are difficult to keep clean. Others depend upon a retainer which is molded into a set form so as to hold its shape in the presence of heat and moisture. The instant invention overcomes these and other drawbacks of the prior art devices.

SUMMARY OF THE INVENTION

The invention concerns a frying pan cover comprising a pair of hoops adapted to interlock concentrically over and upon a piece of paper toweling and hold same as a grease barrier over the frying pan. The principle advantage of the invention is that the device can be used with any piece of absorbent paper which is large enough to be engaged across and over-lap slightly the edges of the inner tubular flange. Also to assemble the device it is only necessary to lay a piece of paper towel over the inner tubular flange, press the outer concentric flange thereover to engage the edges of the towel and trim or tear off the excess towel. Thus, the use of the device is not dependent upon any specially cut or shaped filter papers which add greatly to the cost and inconvenience of use of the prior art devices.

DESCRIPTION OF THE DRAWINGS

Illustrative embodiments of this invention are shown in the accompany drawings in which:

FIG. 1 is a disassembled perspective view of the two parts of the pan cover of this invention with the filter media omitted;

FIG. 1A is a top plan view of the separate parts of the pan cover shown in FIG. 1;

FIG. 2 is a side view showing the position of the parts with a piece of paper towel interposed just prior to assembly;

FIG. 2A is a top plan view of the parts shown in FIG. 2;

FIG. 3 is a side view of the parts shown in FIG. 2 and FIG. 2A after assembly;

FIG. 4 is a perspective view of the cover of this invention, with the excess paper towel torn off, in position on a frying pan;

FIG. 5 is a cross-sectional view taken along the lines 5—5 of FIG. 4; and

FIG. 6 is a top plan view of an alternate form of either the inner or outer hoop member forming a part of the pan cover of this invention.

THE PREFERRED EMBODIMENT

Referring to the drawings, particularly FIG. 1 and FIG. 1A, there is shown a preferred form of this invention, the outer or top tubular flange 10 formed as a continuous circle with the cylindrical inner wall 12 defined between flat top edge 14 and the flat bottom edge 16. The wall 12 is essentially uniform in height and the flange or hoop 10 has the thin flat radial spokes 18 extending from the top edge 14 to the rounded flat hub 20 to which is attached the handle knob 22 by means of the bolt or rivet 24. The spokes 18 can be made integral with the top edge 14 at the points of attachment or affixed by welding or other suitable means. Any number of spokes can be used, as desired.

Complementing the flange 10 there is provided the inner tubular flange 30 having a cylindrical outer wall 32 defined between the flat top edge 34 and the bottom edge 36, also having the radial spokes 38 connected to and integral with the flat center hub 40. These parts are so dimensioned that the outer flange 10 will pass over and encompass the inner flange 30 with the inner wall 12 spaced sufficiently from the outer wall 32 to accommodate and hold a piece of paper towel or the like, as will be described.

Referring to FIGS. 2 and 2A, there is shown the outer flange 10 in position over the inner flange 30, which may be resting on a flat surface, not shown, with an ordinary piece of paper towel 42 interposed therebetween. The paper towel 42 has been torn from a roll of paper towel material comprising a series of sheets joined together along the serrated edges 44. As shown in FIG. 2A the piece of towel is essentially rectangular and overlaps on all sides of both the outer flange 10 and the inner flange 30.

To assemble the cover it is only necessary to place the inner flange 30 on a flat supporting surface, lay the piece of paper towel 42 thereover so that over-lapping edge 46 is presented on all sides, and then press the outer flange 10 thereover to the position shown in FIG. 3. Thus held the towel is tautened by the frictional engagement between the concentric flanges 10 and 30, i.e., between the walls 12 and 32, and the wrinkled protruding excess 46 is readily torn or trimmed off along and adjacent either the edge 16 or the edge 36.

The assembly is placed on the top of a frying pan 50 as shown in FIGS. 4 and 5 to function as the cover during frying processes. In this position, the tautened sections 52 of the towel 46 are between the radially spaced spokes 18 of the top hoop 10 and internally supported by the radially spaced spokes 38 of the inner flange 30.

In FIG. 6, there is represented, in top plan view, either an outer flange 10 with the handle removed or an inner flange (30) with a pair or radial spokes 18 or (38).

FIGS. 4 and 5 show the assembled cover fitting on the inside of the frying pan 50 with the edge 16 of the outer flange 10 impinging against the inner sloping wall 54 of the pan. Alternatively the cover assembly can be used with a smaller frying pan in which event the assembly would fit over the top edge 56 of the pan and rest upon the radial spokes 38 of the inner flange 30. The embodiment shown in FIGS. 4 and 5, that is the relationship of the assembly cover of this invention with the frying pan, is preferred because the peripheral contact of the edge 16 with the inner wall 54 of the pan 50 forms a vapor seal so that escaping vapors from the frying process are forced to take a path through the tautened section 52 of the towel. If the cover is used with a smaller pan than that illustrated the radial spokes 38 would rest upon the top edge 56 of the pan and the seal between the inside of the pan and the atmosphere would be imperfect allowing some of the vapors to by-pass the filter. This is not however, an inoperative arrangement since spatterings of grease would still be trapped by the filter towel and a substantial portion of the effluent vapors and grease droplets or mist would be trapped. The depth of the wall 12 is kept at a minimum so that the cover assembly does not extend upwardly too high when placed on a pan and does not interfere with the handle 58 thereof.

The tubular flanges 10 and 30 are readily formed of metal such as steel or aluminum by stamping and pressing same from a single piece. The flanges can also be assembled from individually formed pieces by welding or brazing the parts together. Instead of flat spokes 18 and 38, these structures can be rod-like. The hubs 20 and 40 can be any size or can be omitted. Provision of the knobs 20 and 40 provides a degree of central rigidity to the structure. The parts can also be made of heat and fire resistant plastics and the handle 22 suitably has thermal insulating properties as well as being fire-proof. The assembly can be made in different sizes to conform to the sizes of standard frying pans, i.e., 8 inch, 10 inch and 11 inch, etc., representing standard sizes. The walls 12 and 32 are shown as concentric or parts of a cylinder as the preferred embodiment. These parts may be slightly frustoconical if desired, as long as the frictional engagement with the towel is not impaired. Alternatively, the handle 22 can be affixed to the inner flange 30, as at the hub 40, in which event the hub 20 would have an aperture large enough to receive the handle therethrough so that it could puncture the paper towel and be exposed for its intended purpose.

Other modifications can be made without departing from the invention.

What is claimed is:
1. A pan lid comprising:
   (a) an outer tubular flange member having a substantially cylindrical inner wall;
   (b) a spoke member extending across said outer flange member and axially offset from one edge of said outer flange member;
   (c) an inner tubular flange member having a substantially cylindrical outer wall;
   (d) a spoke member extending across said inner flange member and axially offset from one edge of said inner flange member;
   (e) said outer flange member being adapted to encompass said inner flange member in a nesting relationship to provide an annular space between said inner and outer walls; sufficient to accommodate therebetween the marginal edge of a layer of absorbent material laid over said inner flange and tauten said layer in supported relationship between said spoke members as said respective edges of said flange members are pressed to a substantially concentric relationship.

2. A pan lid in accordance with claim 1 in which:
   (a) said outer flange member is adapted to nest within the tapered wall of a pan.

3. A pan lid in accordance with claim 1 in which:
   (a) a handle member is provided centrally on said spoke member of the outer flange member.

4. A pan lid in accordance with claim 1 including said layer of absorbent material.

5. A pan lid in accordance with claim 4 in which said layer of absorbent material comprises a paper towel, the corners and sides of which have been torn off along the circumferential edges of said flange members.

References Cited

UNITED STATES PATENTS

| | | | |
|---|---|---|---|
| 2,071,881 | 2/1937 | Krause | 220—44 |
| 2,587,773 | 3/1952 | Sell | 55—384 |

FOREIGN PATENTS

| | | |
|---|---|---|
| 24,704 | 1911 | Great Britain. |

GEORGE E. LOWRANCE, Primary Examiner

U.S. Cl. X.R.

220—24, 44